E. M. DOWDY.
DRAFT DEVICE.
APPLICATION FILED JULY 18, 1910.
977,284.
Patented Nov. 29, 1910.
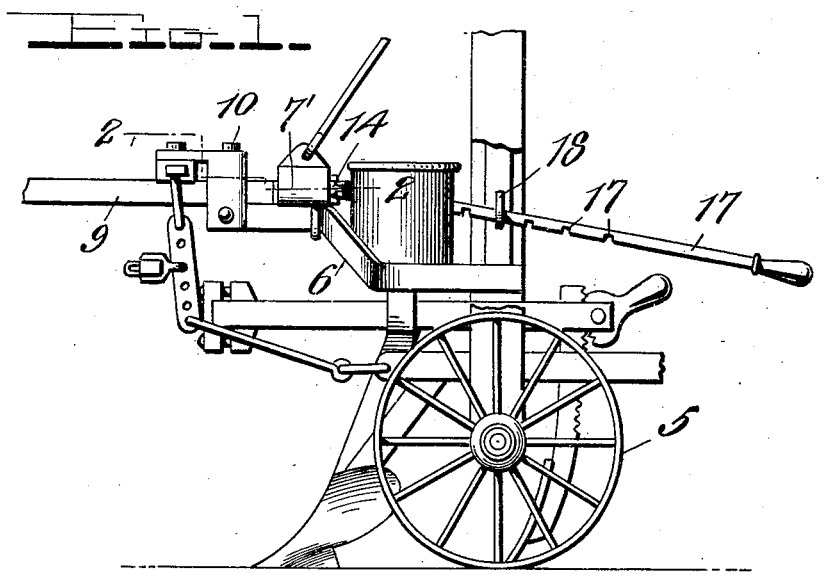
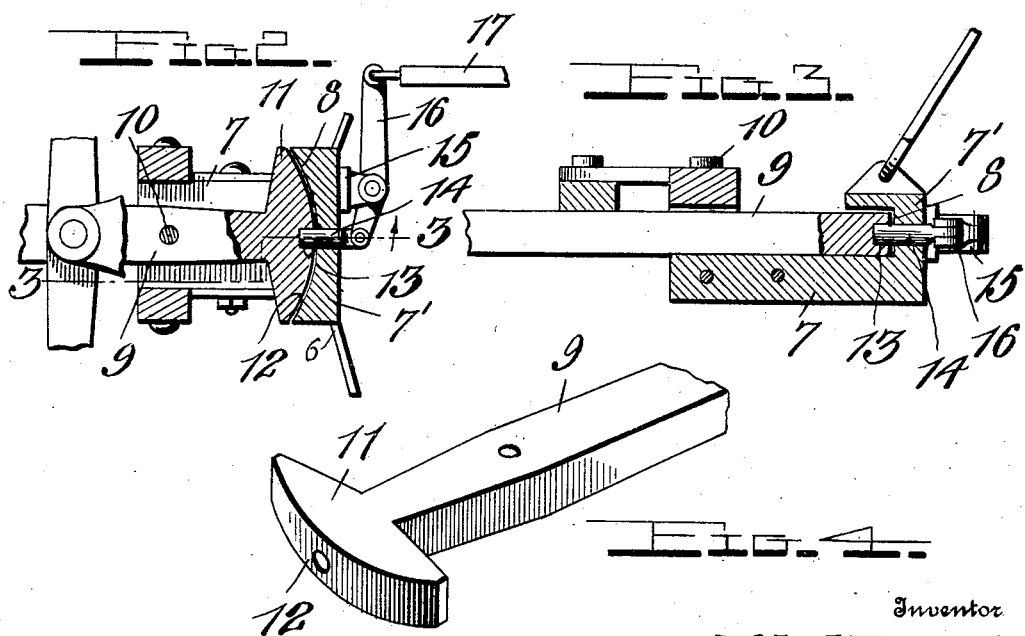
Witnesses
Chas. L. Grieshaber
M. K. Reeder
Inventor
E. M. Dowdy
By Watson E. Coleman
Attorney

UNITED STATES PATENT OFFICE.

EWELL MONROE DOWDY, OF WATER VALLEY, TEXAS.

DRAFT DEVICE.

977,284. Specification of Letters Patent. Patented Nov. 29, 1910.

Original application filed April 2, 1910, Serial No. 553,146. Divided and this application filed July 18, 1910.
Serial No. 572,594.

*To all whom it may concern:*

Be it known that I, EWELL MONROE DOWDY, a citizen of the United States, residing at Water Valley, in the county of Tom Green and State of Texas, have invented certain new and useful Improvements in Draft Devices, of which the following is a specification, reference being had to the accompanying drawings.

This invention relates to an improved draft device and more particularly to a draft device for agricultural machines of that character shown and described in my prior application for patent filed April 2, 1910, Serial Number 553,146; and of which this application is a division.

The primary object of the present invention resides in the provision of means for rigidly locking the tongue when the draft animals are moving in a straight line so as to prevent them from swerving to one side or the other whereby in the planting of seed the seed may be dropped in a straight line as the machine moves over the ground.

A further object of the invention is to provide a wheel supported frame and means carried by said frame and adapted to be manually actuated to rigidly lock the tongue with relation to the frame.

A further object of the invention resides in the provision of a wheel supported frame having a block secured to its forward end and a tongue pivotally mounted thereon provided with an enlarged head, and a manually actuated locking pin movable through the block into a recess in the tongue head to rigidly lock said tongue against pivotal movement.

With these and other objects in view, the invention consists of the novel features of construction and the combination and arrangement of parts hereinafter fully described and claimed, and illustrated in the accompanying drawings, in which—

Figure 1 is a side elevation of the forward end of a seed planting machine of that character illustrated in my pending application hereinbefore referred to; Fig. 2 is a longitudinal section taken on the line 2—2 of Fig. 1; Fig. 3 is a section taken on the line 3—3 of Fig. 2; and Fig. 4 is a detail perspective view of one end of the tongue.

Referring more particularly to the drawings 5 indicates the supporting wheels between which the forwardly extending U-shaped frame 6 is supported. This frame may be mounted in any desired manner, such construction forming no part of the present invention.

Between the forward ends of the frame 6 a tongue supporting block 7 is secured. One end of this block is enlarged, as shown at 7', and one of the edges of this enlargement is formed with a transverse concaved face 8. Upon the block 7 adjacent to its forward end a draft tongue 9 is pivotally mounted upon the stud 10. The end of the tongue is formed with an enlarged head 11. This head is arcuate in plan and the convexed face 12 thereof is disposed adjacent to the concave face of the enlarged end of the block 7. The head 11 normally moves in an arc across the supporting block 7 upon the pivotal movement of the tongue and is adapted to be locked to rigidly secure the same against such movement by means of a pin 14 which is adapted to enter a socket 13 centrally formed in the enlarged head 11 of the tongue. To the enlarged end 7' of the supporting block a bearing plate 15 is secured upon which a lever 16 is pivotally mounted intermediate its ends. This lever is mounted nearer one end that the other and the shorter end thereof is pivotally connected to the sliding locking pin 14. To the other or longer end of the lever 16 one end of an operating bar 17 is connected. This bar is provided with the spaced notches 17' in one edge for engagement with a guide eye 18 secured to the machine structure at any desired point. The free end of the bar 17 is formed with a suitable handle which is adapted to be grasped by the operator from his position on the driver's seat and the bar moved to release the draft tongue when desired.

In the operation of the device, when planting or cultivating and it is desired that the animals move in a straight line across the field so that they will not trample the ground which is to be planted or upon the plant rows, the tongue is positioned in a straight line forwardly of the machine and rigidly locked in such position by the operator pulling upon the bar 17 and forcing the locking pin 14 into the socket 13 in the enlarged end of the tongue. One of the notches 17' in the lever is then engaged with the eye secured to the machine frame whereby said lever is locked against movement.

By thus locking the tongue it will be obvious that the animals are prevented from swerving from side to side out of a straight path and the liability of damage to the immature plants when cultivating is thus eliminated. When it is desired to turn the machine for a return trip across the field, the operator simply releases the bar 17 and forces it forwardly through the guide eye 18. The pin 14 is thus retracted from the socket in the end of the tongue head and the tongue released so that it may have free pivotal movement, whereby the animals may be turned.

From the foregoing it is believed that the construction and operation of my improved draft device will be obvious without requiring any additional description. The device is very simple and may be constructed at a low cost. Its efficiency and utility are apparent, and while it is particularly adapted for use in connection with agricultural machines of various kinds, it will be understood that I do not wish to be limited to such use as it may be applied to various other animal drawn vehicles. It will further be evident that the detail construction and arrangement of the parts is susceptible of considerable modification without departing from the essential features or sacrificing any of the advantages thereof.

Having thus described the invention what is claimed is:

1. In a device of the character described, the combination of a supporting block, said block having an enlargement formed on one end provided with a concaved face, a tongue pivoted on said block, a head formed on one end of the tongue movable over the concaved face of the block and provided with a central socket therein, a locking pin longitudinally movable through the enlarged end of the block for engagement in said socket to lock the tongue against pivotal movement and means for actuating said locking pin.

2. In a device of the character described, the combination of a supporting block, a tongue pivotally mounted on said block, a locking pin movably mounted in the block for engagement with said tongue to lock the same against pivotal movement, a lever pivotally mounted upon said block adjacent to one end and pivoted to said locking pin, and a manually movable bar connected to the other end of said lever to move said locking pin.

3. In a device of the character described, the combination of a supporting block having an enlargement formed on one end thereof, a tongue pivoted upon said block adjacent to its other end, said tongue having oppositely disposed transverse extensions on one end to form a head, the outer face of said head being convex, the enlarged end of the supporting block having a concave face opposed to the convex face of said head, said head being provided with a central socket, the end of said block having an opening therein, a longitudinally movable pin in said opening adapted for engagement in said socket to lock the tongue against pivotal movement, a lever pivoted upon the supporting block adjacent to one end, said end of the lever being pivoted to one end of the locking pin, and a manually-movable bar connected to the other end of said lever to actuate the same and move the locking pin.

In testimony whereof I hereunto affix my signature in the presence of two witnesses.

EWELL MONROE DOWDY.

Witnesses:
W. S. ARMSTRONG,
J. G. COOPER.